(12) United States Patent
Han et al.

(10) Patent No.: US 11,574,445 B2
(45) Date of Patent: Feb. 7, 2023

(54) INTELLIGENT INSPECTION DEVICES

(71) Applicant: LG ELECTRONICS INC., Seoul (KR)

(72) Inventors: Junsoo Han, Seoul (KR); Younghun Yang, Seoul (KR); Yonghwan Eom, Seoul (KR); Junseong Jeong, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 16/677,235

(22) Filed: Nov. 7, 2019

(65) Prior Publication Data
US 2020/0090410 A1    Mar. 19, 2020

(30) Foreign Application Priority Data
Aug. 15, 2019    (KR) .................. 10-2019-0099972

(51) Int. Cl.
| | |
|---|---|
| *G06T 19/00* | (2011.01) |
| *G06K 9/62* | (2022.01) |
| *G06F 9/451* | (2018.01) |
| *G06N 3/02* | (2006.01) |
| *G06T 19/20* | (2011.01) |

(52) U.S. Cl.
CPC ............ *G06T 19/006* (2013.01); *G06F 9/453* (2018.02); *G06K 9/6255* (2013.01); *G06N 3/02* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 6,124,884 | A * | 9/2000 | Fujii ...................... | H04N 17/04 348/93 |
| 6,947,587 | B1 * | 9/2005 | Maeda ............. | G01N 21/95607 382/144 |
| 7,020,350 | B2 * | 3/2006 | Sakai ............... | G01N 21/95607 358/450 |
| 7,570,838 | B2 * | 8/2009 | Yoon ...................... | G11B 7/005 382/275 |
| 7,697,724 | B1 * | 4/2010 | Gao .......................... | G06T 7/33 382/106 |
| 10,114,368 | B2 * | 10/2018 | Greenberg .............. | H01J 37/00 |
| 10,417,511 | B2 * | 9/2019 | Arai ................... | G06K 9/00382 |
| 10,706,505 | B2 * | 7/2020 | Tong ........................ | G01S 17/89 |

(Continued)

*Primary Examiner* — Martin Mushambo
(74) *Attorney, Agent, or Firm* — Lee, Hong, Degerman, Kang & Waimey PC

(57) ABSTRACT

An intelligent inspection device is disclosed. The intelligent inspection device includes a camera configured to photograph a refrigerator that is installed and a processor configured to position a first refrigerator image photographed by the camera in a preset area of an inspection frame, compare the first refrigerator image with the inspection frame, inspect whether a step is present in the refrigerator based on a result of the comparison, and learn a solution corresponding to a result of the inspection to provide the solution to a user. The intelligent inspection device may be associated with an artificial intelligence module, an unmanned aerial vehicle (UAV), a robot, an augmented reality (AR) device, a virtual reality (VR) device, devices related to 5G services, and the like.

13 Claims, 16 Drawing Sheets

(56) References Cited

U.S. PATENT DOCUMENTS

| | | | |
|---|---|---|---|
| 2003/0012423 A1* | 1/2003 | Boland | A61C 9/006 382/154 |
| 2005/0093962 A1* | 5/2005 | Miyatake | G02B 26/127 347/235 |
| 2005/0116911 A1* | 6/2005 | Mukai | G09G 3/20 345/89 |
| 2005/0196035 A1* | 9/2005 | Luo | G06K 9/00369 382/159 |
| 2005/0286095 A1* | 12/2005 | Yoon | G11B 7/005 358/483 |
| 2006/0165277 A1* | 7/2006 | Shan | G06K 9/00785 382/159 |
| 2007/0253618 A1* | 11/2007 | Kim | G06T 7/80 382/154 |
| 2008/0124115 A1* | 5/2008 | Oki | G03G 15/011 399/74 |
| 2009/0179773 A1* | 7/2009 | Denny | G06T 7/80 340/901 |
| 2009/0304260 A1* | 12/2009 | Postolov | G01N 21/956 382/149 |
| 2010/0135595 A1* | 6/2010 | Du | H04N 1/387 382/275 |
| 2010/0316280 A1* | 12/2010 | Lancaster | G06T 7/001 382/154 |
| 2011/0058749 A1* | 3/2011 | Cooper | G06T 7/33 382/218 |
| 2011/0069906 A1* | 3/2011 | Park | G06T 5/50 382/284 |
| 2011/0229019 A1* | 9/2011 | Batur | G06T 5/002 382/159 |
| 2012/0139817 A1* | 6/2012 | Freeman | G02B 27/0101 345/8 |
| 2012/0250112 A1* | 10/2012 | Ogawa | H04N 1/3873 358/479 |
| 2013/0083993 A1* | 4/2013 | Sutou | G06T 7/97 382/154 |
| 2013/0176449 A1* | 7/2013 | Bae | H04N 5/23254 348/208.99 |
| 2014/0044348 A1* | 2/2014 | Chen | G06K 9/00275 382/159 |
| 2014/0150473 A1* | 6/2014 | Boarman | F25C 5/182 62/66 |
| 2014/0192210 A1* | 7/2014 | Gervautz | G06K 9/228 348/207.1 |
| 2014/0270492 A1* | 9/2014 | Christopulos | G06K 9/00536 382/159 |
| 2015/0063684 A1* | 3/2015 | Taylor | G06K 9/00771 382/154 |
| 2015/0356802 A1* | 12/2015 | Cho | G07C 9/00563 700/275 |
| 2015/0382326 A1* | 12/2015 | Seo | H04W 48/16 370/329 |
| 2016/0078608 A1* | 3/2016 | Na | G06T 7/001 382/149 |
| 2016/0125589 A1* | 5/2016 | Tertitski | G06T 7/0004 382/151 |
| 2016/0320182 A1* | 11/2016 | Yamaguchi | H01J 37/28 |
| 2016/0353022 A1* | 12/2016 | Mueller | A61B 5/6889 |
| 2016/0379375 A1* | 12/2016 | Lu | G06K 9/00664 382/103 |
| 2017/0169554 A1* | 6/2017 | Karlinsky | G06K 9/621 |
| 2017/0330337 A1* | 11/2017 | Mizutani | G06T 5/006 |
| 2018/0013995 A1* | 1/2018 | Mizushiro | H04N 9/3147 |
| 2018/0068451 A1* | 3/2018 | Leung | G06T 7/223 |
| 2018/0137651 A1* | 5/2018 | Levinshtein | G06T 7/75 |
| 2018/0180398 A1* | 6/2018 | Pranav | F25D 23/02 |
| 2018/0204097 A1* | 7/2018 | Karki | G06K 9/00281 |
| 2019/0096046 A1* | 3/2019 | Kalantari | G06T 5/50 |
| 2019/0102893 A1* | 4/2019 | Noji | G06T 7/337 |
| 2019/0110032 A1* | 4/2019 | Someya | H04N 9/3194 |
| 2019/0122344 A1* | 4/2019 | Kimura | A61B 1/00045 |
| 2019/0139225 A1* | 5/2019 | Wang | G06K 9/4604 |
| 2020/0098118 A1* | 3/2020 | Namiki | G06T 7/75 |
| 2020/0241629 A1* | 7/2020 | Germer | G06F 3/017 |
| 2020/0410761 A1* | 12/2020 | Cragg | G06F 3/016 |

* cited by examiner

FIG. 11
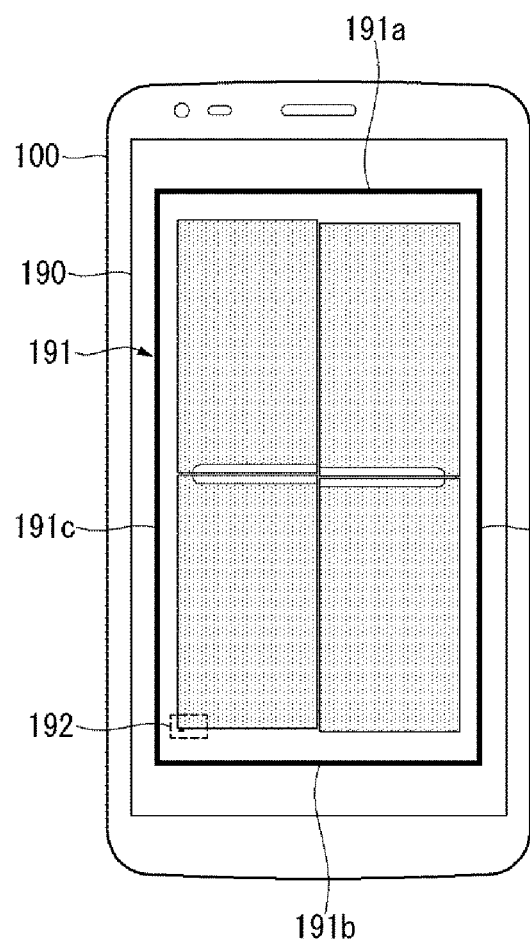
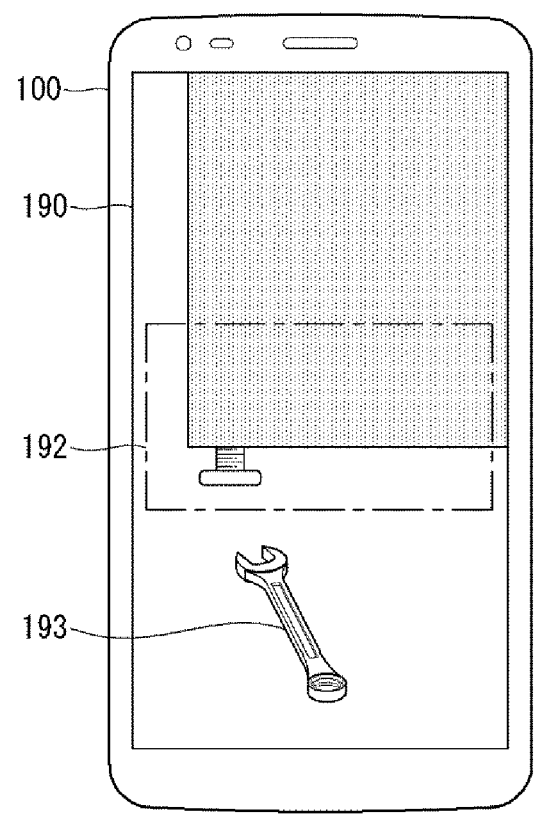
(a)   (b)

FIG. 16
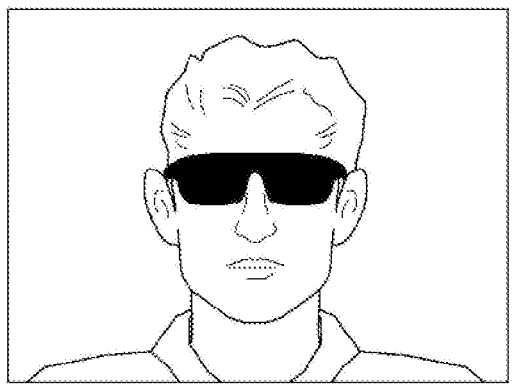
(a)
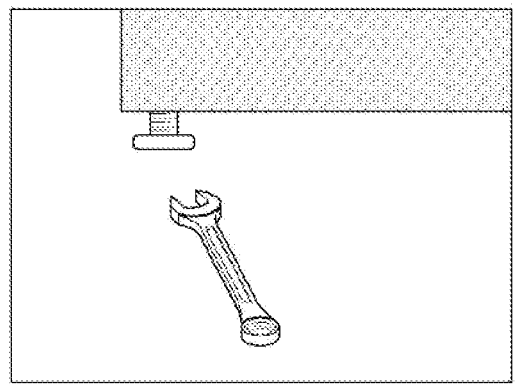
(b)
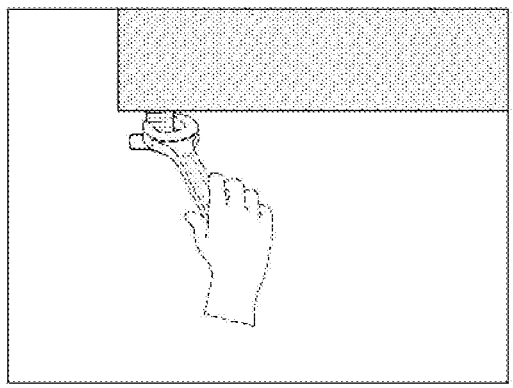
(c)
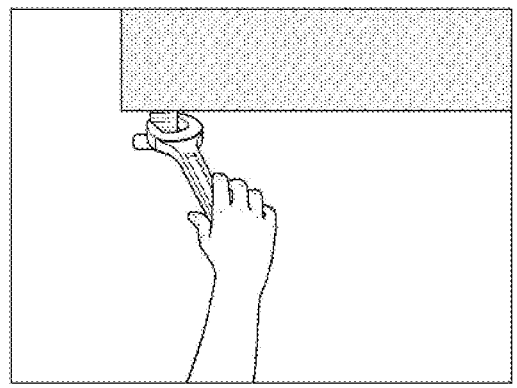
(d)

INTELLIGENT INSPECTION DEVICES

Pursuant to 35 U.S.C. § 119(a), this application claims the benefit of earlier filing date and right of priority to Korean Patent Application No. 10-2019-0099972, filed on Aug. 15, 2019, the contents of which are hereby incorporated by reference herein in its entirety.

BACKGROUND OF THE INVENTION

Field of the Invention

The present disclosure relates to an intelligent inspection device, and more particularly, to an intelligent inspection device capable of collecting noise generated in a refrigerator, comparing the collected noise with a normal operation sound to learn the comparison with artificial intelligence (AI) and inspecting whether the refrigerator fails based on a result of the AI learning.

Related Art

A refrigerator refers to a device for storing items at low temperatures, where cool air generated using a refrigeration cycle is supplied to a storage compartment so as to keep the temperature of the storage compartment lower than the room temperature.

Depending on the difference in internal temperature, the storage compartment is divided into two separate compartments: a freezer compartment in which a sub-zero temperature is maintained; and a fridge compartment in which a higher temperature than the freezer compartment is maintained.

Depending on its shape, the refrigerator may be classified into various types, such as the top freezer type with a freezer compartment provided at the top, the bottom freezer type with the freezer compartment provided at the bottom, the side-by-side type with a fridge compartment and a freezer compartment arranged laterally, and the French door type with a freezer compartment provided at the bottom and other compartments arranged side by side at the top.

The refrigerator to which the side-by-side type is applied generally includes a cabinet forming an exterior, a storage compartment provided inside the cabinet, and right and left doors for opening and closing the storage compartment.

The right and left doors of the refrigerator have different degrees of protruding in the front-back direction (back and forth) of the refrigerator, which leads to a step (d) between the right and left doors. The step may be caused by minute warping of the door, assembly tolerance of the cabinet, or the like in the refrigerator manufacturing process, or by the space in which the refrigerator is installed.

Meanwhile, the front and rear step (d) between the right and left doors leads to poor appearance of the product, and impairs the aesthetic appearance of the entire refrigerator. When the front and rear step occurs between right and left doors as a consumer uses a refrigerator, there is a problem in that aftersales service should be received to eliminate the step.

SUMMARY OF THE INVENTION

An object of the present disclosure is to solve the problems described above.

Furthermore, another object of the present disclosure is to provide an intelligent inspection device capable of inspecting the presence of a front and rear step between right and left doors and providing a step adjustment method corresponding to each user based on a result of the inspection.

Furthermore, still another object of the present disclosure is to provide an intelligent inspection device capable of allowing a user alone to easily adjust the step in a refrigerator by providing an appropriate step adjustment method to the user.

Furthermore, still another object of the present disclosure is to provide an intelligent inspection device capable of solving a problem of poor appearance by easily eliminating the step in a refrigerator.

In one aspect, there is provided an intelligent inspection device, comprising a camera configured to photograph a refrigerator that is installed; and a processor configured to position a first refrigerator image photographed by the camera in a preset area of an inspection frame, compare the first refrigerator image with the inspection frame, inspect whether a step is present in the refrigerator based on a result of the comparison, and learn a solution corresponding to a result of the inspection to provide the solution to a user.

The processor may include an inspection setting unit extracting a reference model for the refrigerator from the first refrigerator image and setting the inspection frame based on the extracted reference model; an inspection positioning unit performing control such that the first refrigerator image is positioned in the inspection frame set by the inspection setting unit; an inspection control unit comparing the first refrigerator image positioned in the inspection frame by the inspection positioning unit with the inspection frame and inspecting whether the step is present in the refrigerator based on the result of the comparison; and an inspection solving unit learning the solution corresponding to the result of the inspection performed by the inspection control unit to provide the solution to the user.

The processor may be configured to pre-process the first refrigerator image; and extract a feature value from the pre-processed first refrigerator image.

The processor may be configured to pre-process the first refrigerator image by using one of gray-scaling, blurring, sharpening, canny edge detection, thresholding, erosion, morphology, and noise removal.

The processor may be configured to perform control such that the first refrigerator image is positioned in the inspection frame by adjusting a size or a position of the first refrigerator image, when the first refrigerator image is not positioned in the inspection frame.

The inspection frame may include a first reference line formed on an upper side of the inspection frame; a second reference line vertically spaced apart from the first reference line and formed on a lower side of the inspection frame; a third reference line formed on a left side of the inspection frame; and a fourth reference line laterally spaced apart from the third reference line and formed on a right side of the inspection frame.

The processor may be configured to compare an upper side of a left door of the refrigerator or an upper side of a right door of the refrigerator with the first reference line or compare a lower side of the left door of the refrigerator or a lower side of the right door of the refrigerator with the second reference line to analyze the comparison; and recognize whether the step is present in the refrigerator by learning a result of analyzing the comparison.

The processor may further include a display unit and is configured to learn the solution corresponding to the result of the inspection performed by the inspection control unit to provide the solution to the user through the display unit.

The processor may be configured to learn the solution corresponding to the result of the inspection performed by the inspection control unit; and transmit the learned solution to an augmented reality electronic device.

The augmented reality electronic device may display a real image of the refrigerator, and at the same time displays a single image formed by superimposing a virtual image of an area of the step to be repaired and a tool image, the area having the step in the refrigerator to be repaired.

The augmented reality electronic device may sequentially display a process of repairing the step in the refrigerator.

The augmented reality electronic device may display the process of repairing the step in the refrigerator while maintaining a constant time interval.

The processor may be configured to receive, from a network, downlink control information (DCI) to be used for scheduling transmission of information on the result of the inspection performed by the intelligent inspection device; and transmit the information on the result of the inspection to the network based on the DCI.

The processor may be configured to perform an initial access procedure with the network based on a synchronization signal block (SSB); and transmit the information on the result of the inspection to the network through a physical uplink shared channel (PUSCH), wherein demodulation reference signals (DM-RS) of the SSB and the PUSCH are quasi co-located (QCLed) for QCL type D.

The processor may be configured to control a communication unit to transmit the information on the result to an artificial intelligent (AI) processor included in the network; and control the communication unit to receive AI processing information from the AI processor, and wherein the AI processing information is information having determination for the presence of the step in the refrigerator.

Effects of the intelligent inspection device according to the present disclosure are as follows.

The present disclosure may allow a user to easily adjust a step in a refrigerator by himself or herself by providing an appropriate step adjustment method to the user.

Further, the present disclosure may solve a problem of poor appearance by easily eliminating a step in a refrigerator by a user himself or herself.

BRIEF DESCRIPTION OF THE DRAWINGS

FIG. 11 is a diagram showing an example of inspecting the step in the refrigerator by using the intelligent inspection device according to the embodiment of the present disclosure.

FIG. 16 is a diagram showing an example of repairing the step in the refrigerator by using an augmented reality electronic device according to the embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
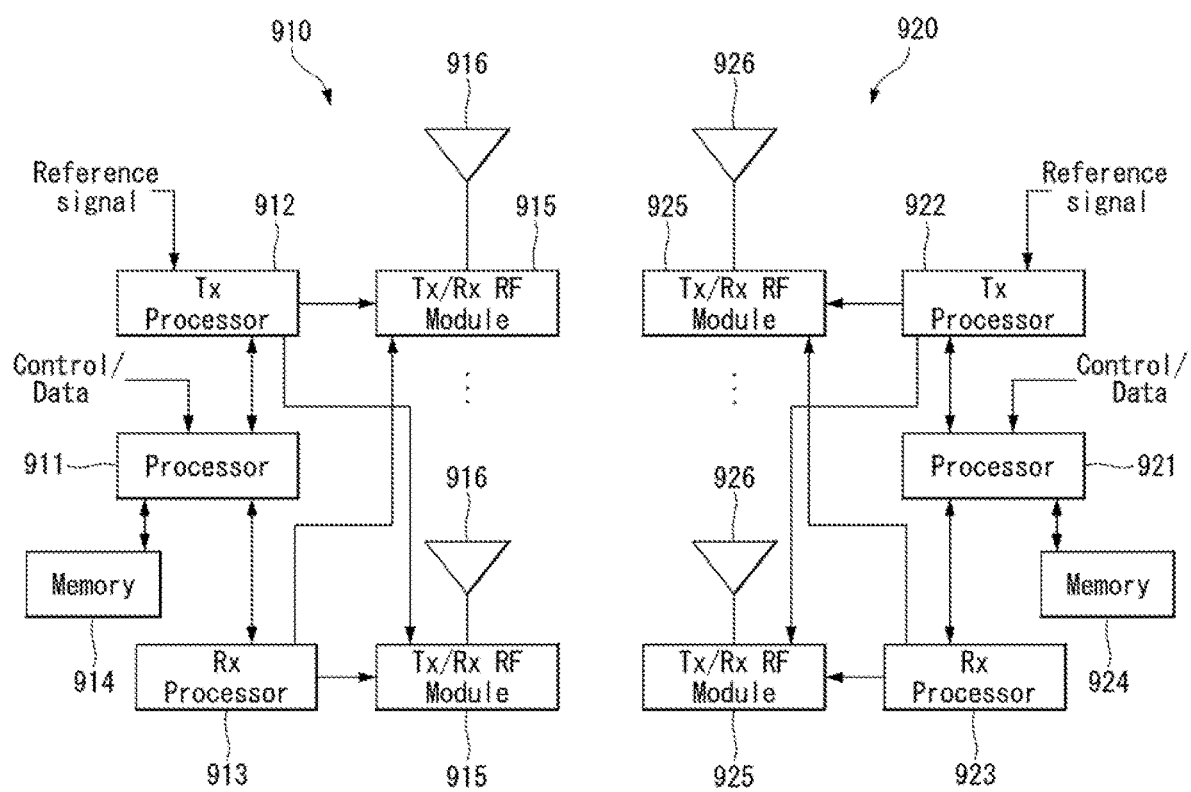
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
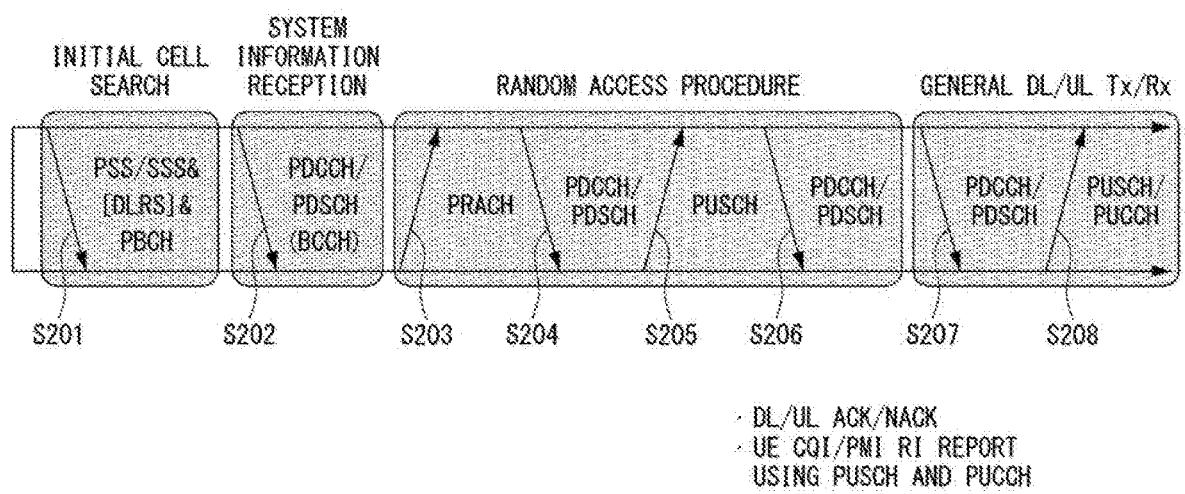
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Intelligent Refrigerators using 5G Communication

Figure 3:
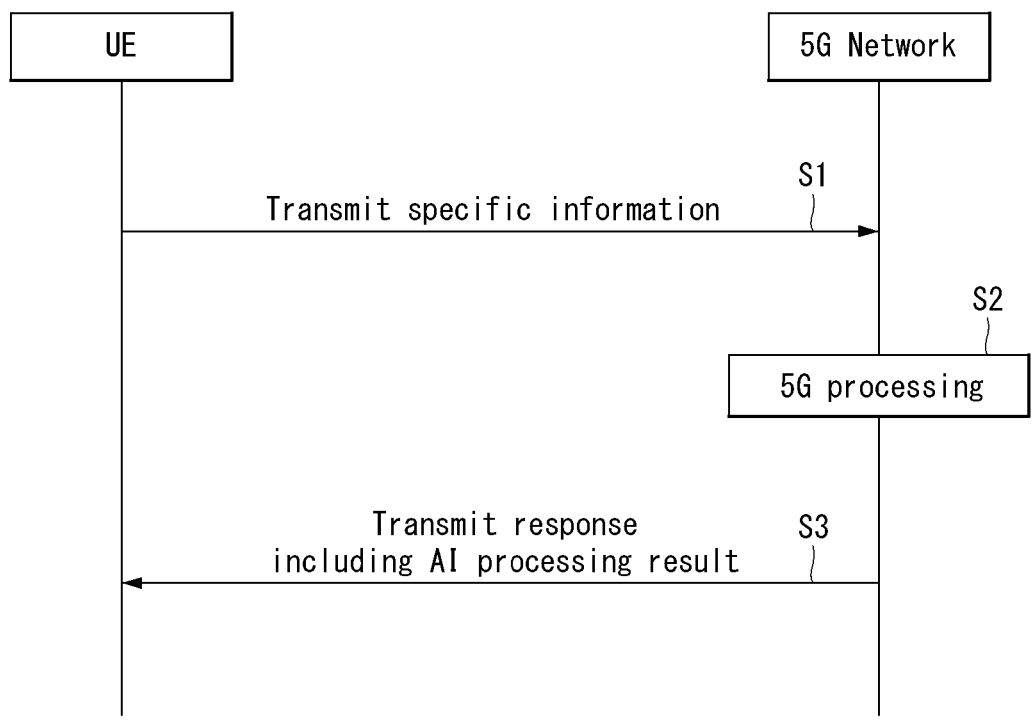
FIG. 3 shows an example of basic operations of a user equipment and a 5G network in a 5G communication system.

FIG. 3 shows an example of basic operations of an intelligent refrigerator and a 5G network in a 5G communication system.

The intelligent refrigerator transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the intelligent refrigerator (S3).

G. Applied Operations Between Intelligent Refrigerator and 5G Network in 5G Communication System Hereinafter, the operation of an intelligent refrigerator using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the intelligent refrigerator performs an initial access procedure and a random access procedure with the 5G network prior to step S1 of FIG. 3 in order to transmit/receive signals, information and the like to/from the 5G network.

More specifically, the intelligent refrigerator performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the intelligent refrigerator receives a signal from the 5G network.

In addition, the intelligent refrigerator performs a random access procedure with the 5G network for UL synchronization acquisition and/or UL transmission. The 5G network can transmit, to the intelligent refrigerator, a UL grant for scheduling transmission of specific information. Accordingly, the intelligent refrigerator transmits the specific information to the 5G network on the basis of the UL grant. In addition, the 5G network transmits, to the intelligent refrigerator, a DL grant for scheduling transmission of 5G processing results with respect to the specific information. Accordingly, the 5G network can transmit, to the intelligent refrigerator, information (or a signal) related to remote control on the basis of the DL grant.

Next, a basic procedure of an applied operation to which a method proposed by the present disclosure which will be described later and URLLC of 5G communication are applied will be described.

As described above, an intelligent refrigerator can receive DownlinkPreemption IE from the 5G network after the intelligent refrigerator performs an initial access procedure and/or a random access procedure with the 5G network. Then, the intelligent refrigerator receives DCI format 2_1 including a preemption indication from the 5G network on the basis of DownlinkPreemption IE. The intelligent refrigerator does not perform (or expect or assume) reception of eMBB data in resources (PRBs and/or OFDM symbols) indicated by the preemption indication. Thereafter, when the intelligent refrigerator needs to transmit specific information, the intelligent refrigerator can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the intelligent refrigerator receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the intelligent refrigerator transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
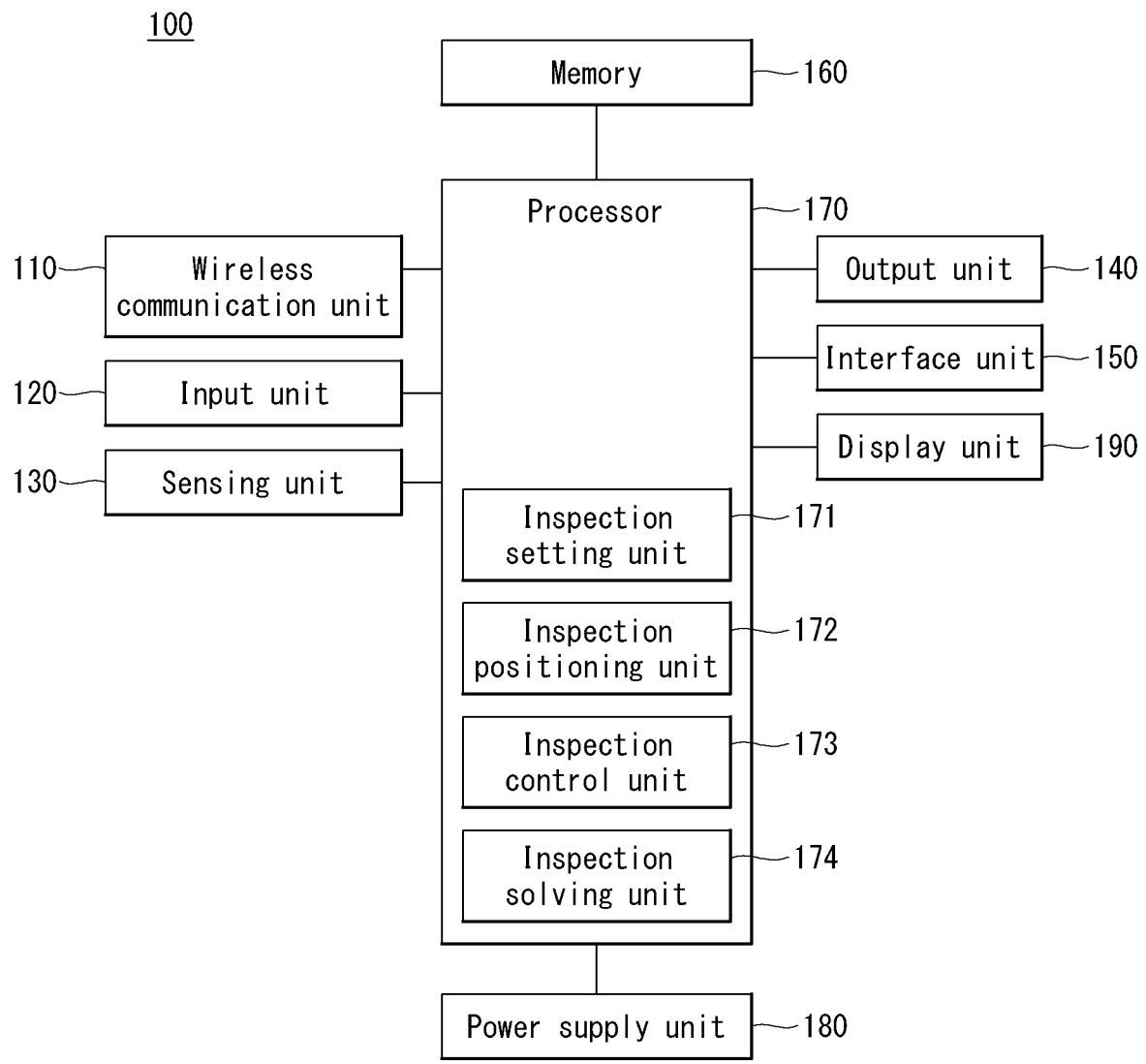
FIG. 4 is a diagram for describing an intelligent inspection device according to an embodiment of the present disclosure.

FIG. 4 is a diagram for describing an intelligent inspection device according to an embodiment of the present disclosure.

Referring to FIG. 4, an intelligent inspection device 100 according to the embodiment of the present disclosure may include a wireless communication unit 110, an input unit 120, a sensing unit 130, an output unit 140, an interface unit 150, a memory 160, a processor 170, and a power supply unit 180. The components shown in FIG. 4 are not necessarily required to implement the intelligent inspection device 100, so that the intelligent inspection device 100 described in the present disclosure may include more or fewer components than those listed above. The intelligent inspection device 100 may be referred to as an electronic device.

The wireless communication unit 110 may include one or modules that enable wireless communication between the intelligent inspection device 100 and a wireless communication system, between the intelligent inspection device 100 and another intelligent inspection device, or between the intelligent inspection device 100 and an external server. In addition, the wireless communication unit 110 may include one or more modules for connecting the intelligent inspection device 100 to one or more networks.

The wireless communication unit 110 may include at least one of a broadcast receiving module, a mobile communication module, a wireless internet module, a short range communication module, and a location information module.

The input unit 120 may include a camera or an image input unit for inputting an image signal, a microphone or an audio input unit for inputting an audio signal, and a user input unit (for example, a touch key or a mechanical key) for receiving information from a user. Voice data or image data collected by the input unit 120 may be analyzed and processed as a control command of a user.

The sensing unit 130 may include one or more sensors for sensing at least one of information within the intelligent inspection device 100, information on the surrounding environment, which surrounds the intelligent inspection device 100, and user information.

For example, the sensing unit 130 may include at least one of a proximity sensor, an illumination sensor, a touch sensor, an acceleration sensor, a magnetic sensor, a gravity (G)-sensor, a gyroscope sensor, a motion sensor, an RGB sensor, an infrared sensor (IR sensor), a fingerprint scan sensor, an ultrasonic sensor, an optical sensor (for example, imaging means), a microphone, a battery gauge, an environmental sensor (for example, a barometer, a hygrometer, a thermometer, a radiation detection sensor, a heat detection sensor, or a gas detection sensor), and a chemical sensor (for example, an electronic nose, a healthcare sensor, or a biometric sensor). Meanwhile, the intelligent inspection device disclosed in the present disclosure may utilize a combination of information sensed by at least two of these sensors.

The output unit 140 is used to generate a visual, auditory, or tactile-related output, and may include at least one of a display unit 190, a sound output unit, a haptic module, and an optical output unit. The display unit 190 may form an inter-layer structure or an integrated structure with the touch sensor, thereby implementing a touch screen. The touch screen functions as user input means for providing an input interface between an augmented reality electronic device and a user, and at the same time, may provide an output interface between the augmented reality electronic device and the user.

The interface unit 150 may function as a path to various types of external devices connected to the intelligent inspection device 100. Through the interface unit 150, the intelligent inspection device 100 may receive a virtual reality or augmented reality content from the external device, and perform interactions by exchanging various input signals, sensing signals, and data.

For example, the interface unit 150 may include at least one of a device equipped with a wired/wireless headset port, an external charger port, a wired/wireless data port, a memory card port, a port for connecting a device equipped with an identification module, an audio input/output (I/O) port, a video input/output (I/O) port, and an earphone port.

In addition, the memory 160 may store data supporting various functions of the intelligent inspection device 100. The memory 160 may store a plurality of application programs or applications that are driven by the intelligent inspection device 100, and data and instructions for operating the intelligent inspection device 100. At least some of these application programs may be downloaded from the external server through wireless communication. In addition, at least some of these application programs may be present on an intelligent inspection device from the time of shipment for basic functions (for example, a function to receive and make calls, and a function to receive and send messages) of the intelligent inspection device 100.

Typically, the processor 170 may control the overall operation of the intelligent inspection device 100 in addition to the operations related to the application programs. The processor 170 may process signals, data, information, and the like, which are input or output through the above-described components.

The processor 170 may provide appropriate information to a user or process functions by driving application programs stored in the memory 160 to control at least some of the components. Further, the processor 170 may operate at least two of the components included in the intelligent inspection device 100 in combination so as to drive the application programs.

The processor 170 may detect the movement of the intelligent inspection device 100 or the user by using the gyroscope sensor, the G-sensor, the motion sensor, and the like, which are included in the sensing unit 130. Alternatively, the processor 170 may detect an object approaching the intelligent inspection device 100 or the user by using the proximity sensor, the illumination sensor, the magnetic sensor, the ultrasonic sensor, the optical sensor, and the like, which are included in the sensing unit 130. In addition, the processor 170 may detect the movement of the user through sensors provided in a controller that operates in conjunction with the intelligent inspection device 100.

The processor 170 may perform an operation (or function) of the intelligent inspection device 100 by using the application program stored in the memory 160.

The processor 170 may receive a first refrigerator image through the input unit 120. That is, the processor 170 may position the first refrigerator image photographed by the camera within a preset area of an inspection frame, compare the first refrigerator image with the inspection frame, inspect whether a step is present in the refrigerator based on a result of the comparison, and learn a solution corresponding to a result of the inspection to provide the solution to a user.

The processor 170 may include an inspection setting unit 171, an inspection positioning unit 172, an inspection control unit 173, and an inspection solving unit 174.

The inspection setting unit 171 may recognize a reference model for the refrigerator from the first refrigerator image and set an inspection frame (not illustrated) based on the recognized reference model. The inspection setting unit 171 may extract a feature value of the refrigerator from the photographed or input first refrigerator image, and recognize or predict a reference model with the extracted value. The inspection setting unit 171 may set the inspection frame corresponding to the reference model in consideration of the overall size of the recognized reference model. The inspection frame may be displayed on the display screen.

The inspection positioning unit 172 may perform control such that the first refrigerator image is positioned in the inspection frame set by the inspection setting unit 171. When the inspection frame is set, the inspection positioning unit 172 may precisely adjust the position of the first refrigerator image such that the first refrigerator image is positioned in the inspection frame. For example, the inspection positioning unit 172 may make position adjustment such that the lower portion of the first refrigerator image to correspond to a reference line of the inspection frame. The reference line of the inspection frame may include first to fourth reference lines.

The inspection control unit 131 may compare the first refrigerator image positioned in the inspection frame by the inspection positioning unit 172 with the inspection frame and inspect whether the step is present in the refrigerator based on the result of the comparison. When a left door or a right door of the refrigerator corresponds to the first reference line or the second reference line in the first refrigerator image by the inspection positioning unit 172, the inspection control unit 173 may select one of the first reference line or the second reference line, and measure a step in the door of the refrigerator based on the selected reference line. For example, when the inspection control unit 173 selects the upper side of the left door of the refrigerator and the first reference line, the inspection control unit 173 may inspect whether the step is present in the door of the refrigerator by measuring a space or a separated distance between the upper side of the right door of the refrigerator and the first reference line. The inspection control unit 173 may inspect that the step is present in the door when the measured space or separated distance is out of a preset error range. Alternatively, the inspection control unit 173 may inspect that the step is not present in the door when the measured space or separated distance falls within the preset error range.

The inspection solving unit 174 may learn the solution corresponding to a result of inspection performed by the inspection control unit 173 to provide the solution to the user. The inspection solving unit 174 may learn different solutions based on the result of the inspection. The inspection solving unit 174 may provide a solution suitable for each user in consideration of the surrounding environment and the installation space of the installed refrigerator and the age and the gender of the user who wants to repair the refrigerator. For example, the inspection solving unit 174 may provide a method for adjusting the step in the refrigerator with a small force even though it takes a lot of time, or provide a method for quickly adjusting the step in the refrigerator with a large force. That is, the inspection solving unit 174 learns to recommend different tools depending on age and gender, so that the user may easily and conveniently adjust the step in the refrigerator.

The power supply unit 180 receives power from an external power source or an internal power source under the control of the processor 170 to supply the power to each component included in an electronic device 20. The power supply unit 180 may include a battery, and the battery may be provided in a built-in or replaceable form.

At least some of the above components may operate in cooperation with each other in order to implement an operation, control, or a control method of the intelligent inspection device 100 according to various embodiments to be described below. In addition, the operation, the control, or the control method of the intelligent inspection device may be implemented on the intelligent inspection device 100 by driving at least one application program stored in the memory 160.

Figure 5:
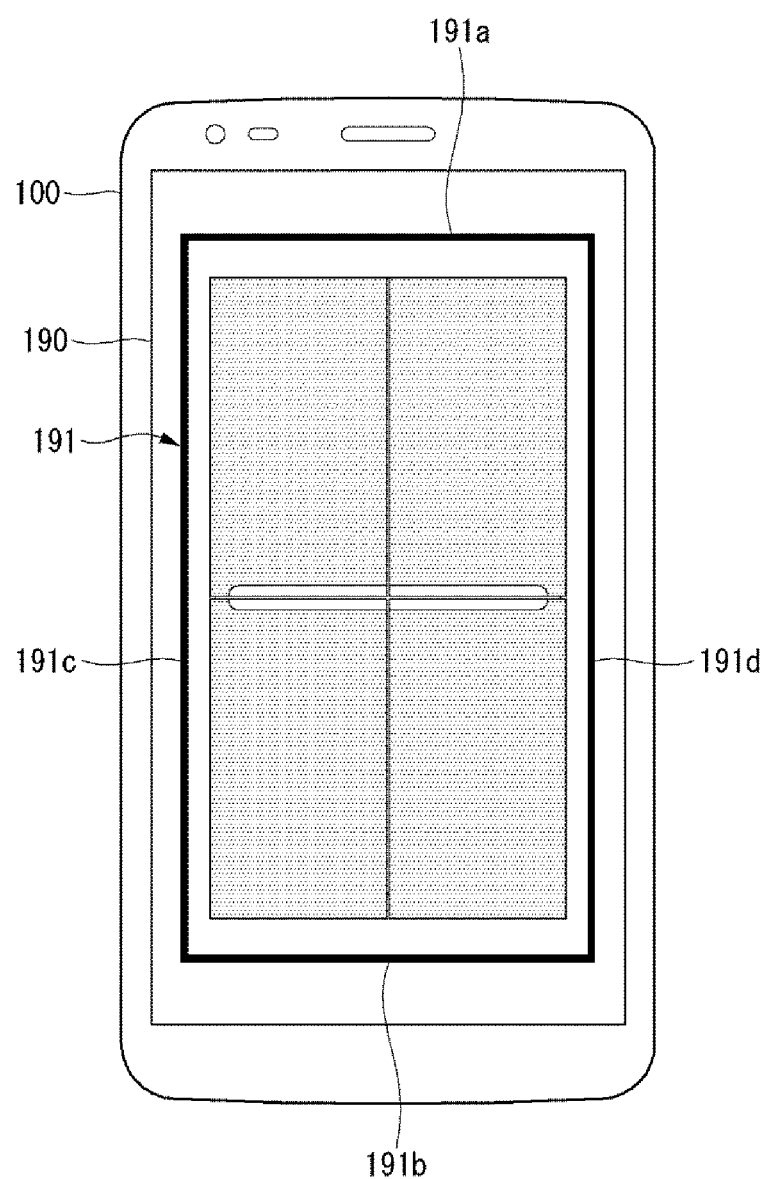
FIG. 5 is a diagram for describing an inspection frame according to the embodiment of the present disclosure.

FIG. 5 is a diagram for describing an inspection frame according to the embodiment of the present disclosure.

Referring to FIG. 5, the intelligent inspection device 100 according to the embodiment of the present disclosure may display an inspection frame 191 on the display unit 190.

The inspection frame 191 may have a quadrangular shape formed with lines having a predetermined width. For example, the reference line of the inspection frame 191 may include a first reference line 191a to a fourth reference line 191d. The first reference line 191a may be defined as a line formed on the upper side of the inspection frame 191. The first reference line 191a may be referred to as an upper reference line. The second reference line 191b may be defined as a line formed on the lower side of the inspection frame 191. The second reference line 191b may be referred to as a lower reference line.

The first reference line 191a and the second reference line 191b may be disposed in a state of being spaced apart from each other in the vertical direction. The first reference line 191a and the second reference line 191b may be in a horizontal state forming an equilibrium without inclining to one side in the horizontal direction.

The third reference line 191c may be defined as a line formed on the left side of the inspection frame 191. The third reference line 191c may be referred to as a left reference line. The fourth reference line 191d may be defined as a line formed on the right side of the inspection frame 191. The fourth reference line 191d may be referred to as a right reference line.

The third reference line 191c and the fourth reference line 191d may be disposed in a state of being spaced apart from each other in the horizontal direction. The third reference line 191c and the fourth reference line 191d may be in a vertical state forming an equilibrium without inclining to one side in the vertical direction.

The inspection positioning unit 172 may make adjustment such that an upper side of a left door or an upper side of a right door of a refrigerator 10 in the first refrigerator image is positioned on the first reference line 191a. Alternatively, the inspection positioning unit 172 may make adjustment such that a lower side of the left door or a lower side of the right door of the refrigerator 10 in the first refrigerator image is positioned on the second reference line 191b.

The inspection positioning unit 172 may make adjustment such that the bottom of the left door or the bottom of the right door of the refrigerator 10 in the first refrigerator image is positioned on the reference line of the inspection frame 191.

Hereinafter, the intelligent inspection device 100 described as an example of the present disclosure will be described with reference to an embodiment applied to a smartphone. However, the embodiment of the intelligent inspection device 100 according to the present disclosure may include a mobile phone, a smart device, a laptop computer, a terminal for digital broadcasting, personal digital assistants (PDA), a portable multimedia player (PMP), a navigation device, a slate PC, a tablet PC, an ultrabook, a head mounted display (HMD), and a wearable device. In addition to the HMD, the wearable device may include a smartwatch and a contact lens.

Figure 6:
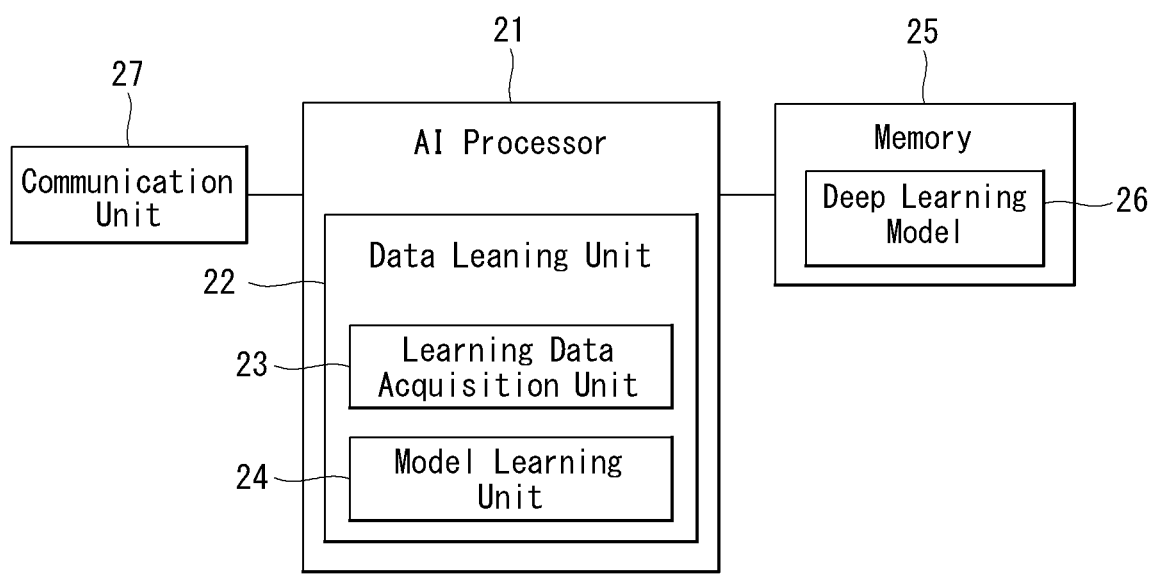
FIG. 6 is a block diagram of an AI device according to the embodiment of the present disclosure.

FIG. 6 is a block diagram of an AI device according to an embodiment of the present disclosure.

An AI device 20 may include an electronic device including an AI module that can perform AI processing, a server including the AI module, or the like. Further, the AI device 20 may be included as at least one component of the intelligent refrigerator 100 shown in FIG. 4 to perform together at least a portion of the AI processing.

The AI processing may include all operations related to driving of the intelligent refrigerator 100 shown in FIG. 5.

For example, the artificial intelligent refrigerator 100 can perform operations of processing/determining, and control signal generating by performing AI processing on sensing data. Further, for example, the artificial intelligent refrigerator 100 can control the internal temperature of the refrigerating compartment or the internal temperature of the freezing compartment by performing AI processing on data acquired through interaction with another electronic device disposed in the refrigerator.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to internal temperature of the artificial intelligent refrigerator 100. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, internal temperature data of the refrigerating compartment, internal temperature data of the freezing compartment, and/or external temperature data of the artificial intelligent refrigerator to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selecting unit can select only data about an object included in a specific period as learning data by performing detection for the specific period on data acquired through the internal temperature data of the refrigerating compartment, internal temperature data of the freezing compartment, and/or external temperature data of the artificial intelligent refrigerator.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an intelligent refrigerator. Further, the AI device 20 may be defined as another vehicle or a 5G network that communicates with the intelligent refrigerator. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 6 was functionally separately described into the AI processor 21, the memory 25, the communication unit 27, etc., but it should be noted that the aforementioned components may be integrated in one module and referred to as an AI module.

Figure 7:
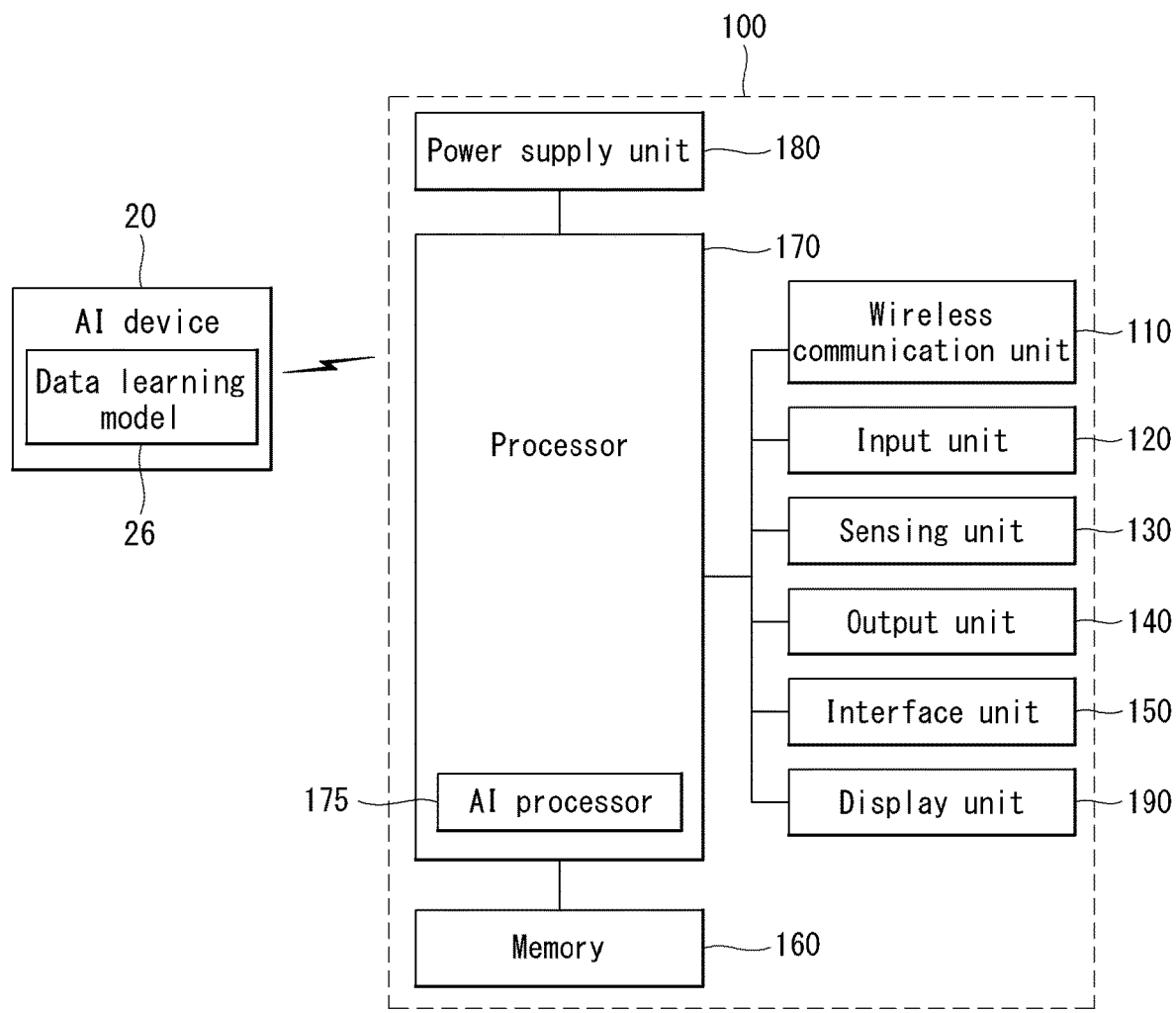
FIG. 7 is a diagram for describing a system in which the intelligent inspection device is cooperated with the AI device, according to the embodiment of the present disclosure.

FIG. 7 is a diagram for describing a system in which the intelligent inspection device is cooperated with the AI device, according to the embodiment of the present disclosure.

Referring to FIG. 7, the intelligent inspection device 100 may transmit data requiring AI processing to the AI device 20 through the communication unit and the AI device 20 including a deep learning model 26 may transmit an AI processing result obtained by using the deep learning model 26 to the intelligent inspection device. The AI device 20 may refer to the contents described in FIG. 6.

The intelligent inspection device 100 may include the wireless communication unit 110, the input unit 120, the sensing unit 130, the output unit 140, the interface unit 150, the memory 160, the processor 170, and the power supply unit 180. The processor 170 may further include an AI processor 175.

Since the wireless communication unit 110, the input unit 120, the sensing unit 130, the output unit 140, the interface unit 150, the memory 160, the processor 170, and the power supply unit 180, which are components of the intelligent inspection device 100, have been fully described with reference to FIG. 4, description thereof will be omitted.

The AI processor 175 may generate state data on whether the step is present in the refrigerator 10 by applying a neural network model to sensing data generated by at least one sensor. The AI processing data generated by applying the neural network model may include at least one of data on the object included in the first refrigerator image or the inspection frame.

The intelligent inspection device 100 may transmit the sensing data obtained by the at least one sensor to the AI device 20 through the wireless communication unit, and the AI device 20 may apply the neural network model 26 to the transmitted sensing data to generate AI processing data. Then, the AI device 20 may transmit, to the intelligent inspection device 100, the AI processing data as data on whether the step is present in the refrigerator or data or information on a solution for eliminating the step in the refrigerator.

According to the embodiment, the AI processor 175 may perform a deep learning computation based on a plurality pieces of data sensed by the sensing unit 120 and provide various methods for eliminating the step in the refrigerator 10 based on the generated AI processing data.

Hereinbefore, according to the embodiment of the present disclosure, the overview for detecting whether the step is present in the refrigerator, performing AI processing by applying 5G communication needed to implement the method for eliminating the step in the refrigerator, and transmitting and receiving the AI processing result has been described.

Hereinafter, according to the embodiment of the present disclosure, a method for positioning the photographed first refrigerator image in the inspection frame, detecting whether the step is present in the refrigerator in consideration of a position, an angle, and the like of the refrigerator, and eliminating the step in the refrigerator will be described with reference to the accompanying drawings.

Figure 8:
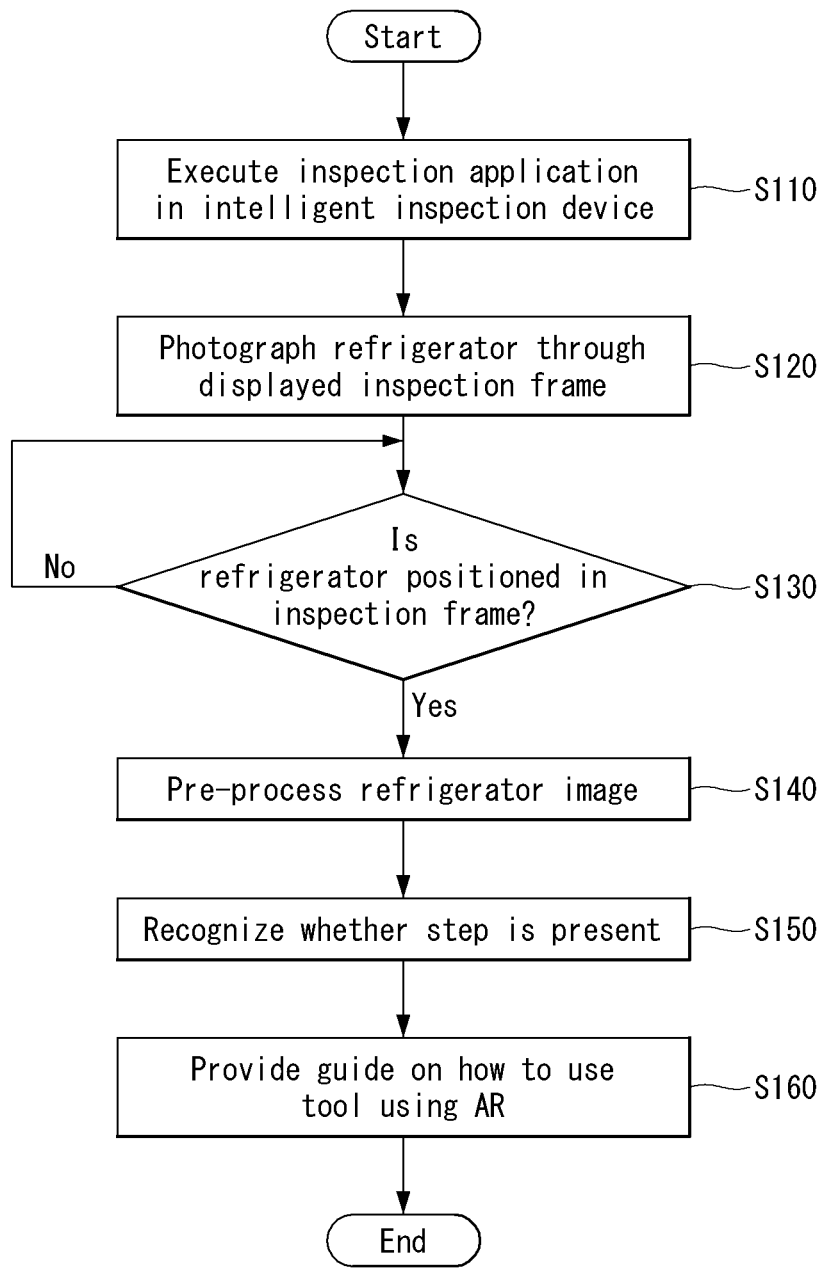
FIG. 8 is a flowchart showing a method for inspecting a refrigerator by using the intelligent inspection device according to the embodiment of the present disclosure.

FIG. 8 is a flowchart showing a method for inspecting a refrigerator using the intelligent inspection device according to the embodiment of the present disclosure.

Referring to FIG. 8, the intelligent inspection device of the present disclosure may inspect the step in the refrigerator in the following order.

First, the intelligent inspection device may execute an inspection application (app) or an inspection program (S110). When the inspection app is executed, the intelligent inspection device may display an inspection frame through the display unit.

The intelligent inspection device may photograph a refrigerator installed in a predetermined area by using a built-in camera. The intelligent inspection device may perform control such that the first refrigerator image is photographed by using the camera linked to the displayed inspection frame (S120).

The intelligent inspection device may determine whether the first refrigerator image is positioned in the inspection frame (S130). When the first refrigerator image is positioned in the inspection frame, the process may proceed to the next step by the intelligent inspection device.

On the other hand, when the first refrigerator image is not positioned in the inspection frame, the intelligent inspection device may make adjustment such that the first refrigerator image is positioned in the inspection frame by checking the size or the position of the first refrigerator image.

When the first refrigerator image is positioned in the inspection frame, the intelligent inspection device may pre-process the first refrigerator image (S140). The intelligent inspection device may cause the processor to pre-process the first refrigerator image by using one of gray-scaling, blurring, sharpening, canny edge detection, thresholding, erosion, morphology, and noise removal.

The processor may extract a feature value from the first refrigerator image by pre-processing the first refrigerator image. For example, the feature value may be data on the edge of the refrigerator door.

The intelligent inspection device may compare the pre-processed first refrigerator image with the reference line of the inspection frame to analyze the comparison, learn the result of analyzing the comparison, and recognize whether the step is present in the refrigerator (S150).

When it is recognized that the step is present in the refrigerator, the intelligent inspection device may provide a guide for eliminating the step in consideration of the surrounding environment, the presence of the recognized step, the information on the user, and the like (S160). For example, the intelligent inspection device may display a video on how to use a tool to eliminate the step in the refrigerator through the display unit.

Figure 9:
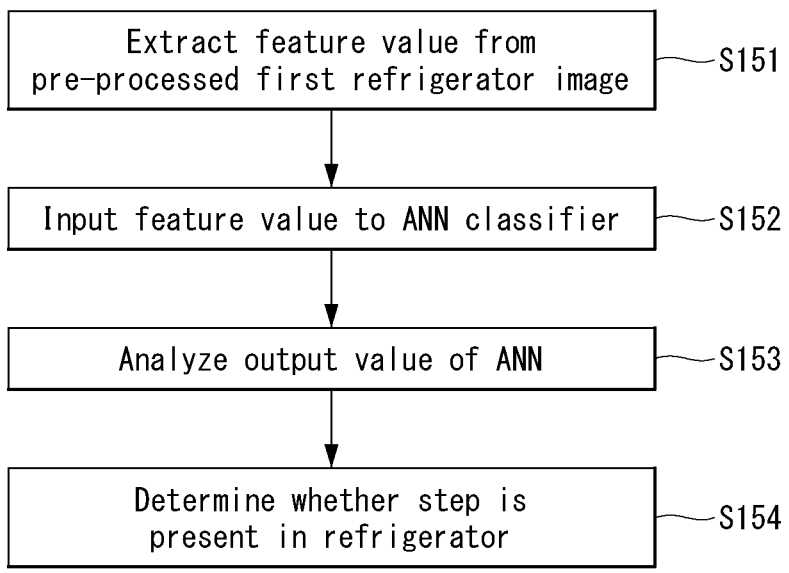
FIG. 9 is a diagram for describing an example of repairing the step using the intelligent inspection device in the embodiment of the present disclosure.

FIG. 9 is a diagram for describing an example of repairing the step by using the intelligent inspection device in the embodiment of the present disclosure.

Referring to FIG. 9, the processor may extract feature values from the pre-processed first refrigerator image in order to recognize whether the step is present in the refrigerator (S151).

For example, the processor may extract feature values while pre-processing the first refrigerator image. The feature values are those for the edge of the refrigerator door, and are calculated as values for specific things such as the edges of the upper, lower, left, and right sides of the left door of the refrigerator and the edges of the upper, lower, left, and right sides of the right door of the refrigerator.

The processor may perform control such that the feature values are input to an artificial neural network (ANN) classifier trained to distinguish whether the step is present in the refrigerator (S152).

The processor may generate a step state of the refrigerator by combining the extracted feature values. The step state of the refrigerator may be input to the ANN classifier trained to distinguish whether the step is present in the refrigerator based on the space or separated distance between the extracted feature values and the inspection frame, and the like.

The processor may analyze the output value of the artificial neural network (S153), and determine or recognize whether the step is present in the refrigerator based on the analyzed output value of the artificial neural network (S154). The processor may determine or recognize whether the step is present in the refrigerator from the output of the ANN classifier.

Meanwhile, in FIG. 9, the example in which the operation of identifying whether the step is present in the refrigerator through AI processing is implemented in the processing of the intelligent inspection device has been described, but the present disclosure is not limited thereto. For example, AI processing may be performed on a 5G network based on sensing information received from the intelligent inspection device.

Figure 10:
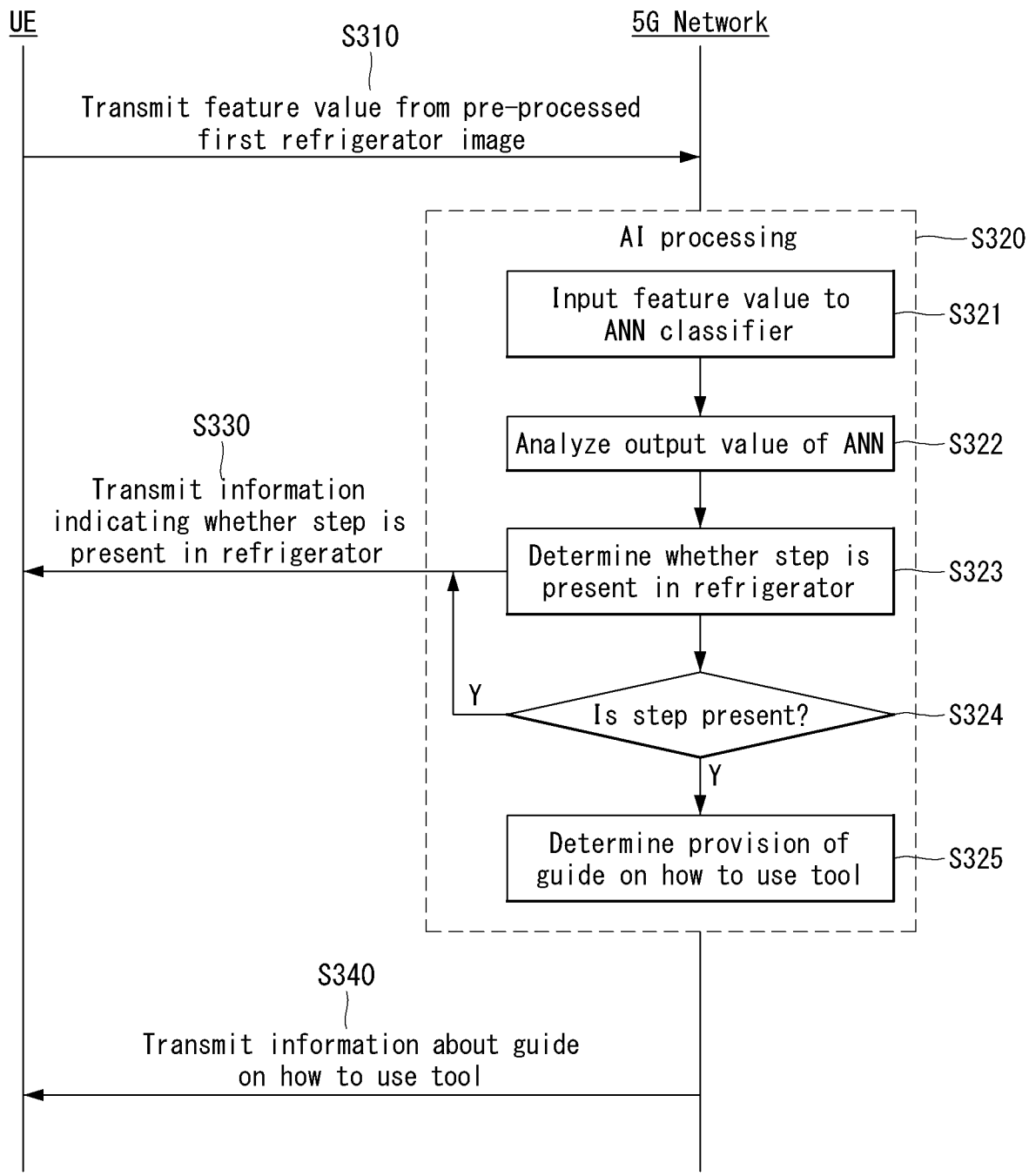
FIG. 10 is a diagram for describing another example of determining whether the step is present in the refrigerator in the embodiment of the present disclosure.

FIG. 10 is a diagram for describing another example of determining whether the step is present in the refrigerator in the embodiment of the present disclosure.

The processor may control the communication unit so as to transmit the step information of the refrigerator to an AI processor included in the 5G network. In addition, the processor may control the communication unit so as to receive AI processing information from the AI processor.

The AI processing information may be information indicating the determination for whether the step is present in the refrigerator.

Meanwhile, the intelligent inspection device may perform an initial access procedure with a 5G network in order to transmit information indicating whether the step is present in the refrigerator to the 5G network. The intelligent inspection device may perform the initial access procedure with the 5G network based on a synchronization signal block (SSB).

In addition, the intelligent inspection device may receive, from the network, downlink control information (DCI) used to schedule transmission of information indicating whether the step is present in the refrigerator by the image pre-processed first refrigerator under control of the processor through the wireless communication unit.

The processor may transmit, to the network, the information indicating whether the step is present in the refrigerator based on the DCI.

The information indicating whether the step is present in the refrigerator may be transmitted to the network through the PUSCH, and the DM-RS of the SSB and the PUSCH may be QCLed for QCL type D.

Referring to FIG. 10, the intelligent inspection device may transmit, to the 5G network, the feature values extracted from the first refrigerator image pre-processed in order to recognize whether the step is present in the refrigerator (S310).

Here, the 5G network may include an AI processor or an AI system, and the AI system of the 5G network may perform the AI processing based on the pre-processed first refrigerator image received or the feature values extracted from the pre-processed first refrigerator image (S320).

The AI system may input the feature values received from the intelligent inspection device into the ANN classifier (S321). The AI system may analyze an ANN output value (S322), and determine whether the step is present in the refrigerator from the ANN output value (S323). The 5G network may transmit information indicating whether the step is present in the refrigerator, which is determined by the AI system, to the refrigerator or the intelligent inspection device through the wireless communication unit.

Here, the information indicating whether the step is present in the refrigerator may include whether the step is present in the door of the refrigerator, and the like.

When it is determined that a step is present in the refrigerator (S324), the AI system may display a method for repairing the step. Detailed description thereof will be described later.

When it is determined that there is the step in the refrigerator, the AI system may determine provision of a guide on how to use a tool, which may be played or performed in the intelligent inspection device (S325). In addition, the AI system may transmit information about the guide on how to use a tool to the intelligent inspection device (S340).

Meanwhile, the intelligent inspection device may transmit only the pre-processed first refrigerator image to the 5G network, and extract feature values corresponding to step detection inputs, which are used to be input to the artificial neural network for determining whether the step is present in the refrigerator from the pre-processed first refrigerator image in the AI system included in the 5G network.

FIG. 11 is a diagram illustrating an example of inspecting the step in the refrigerator by using the intelligent inspection device according to the embodiment of the present disclosure.

Referring to FIG. 11, the intelligent inspection device may position the first refrigerator image in the inspection frame. The intelligent inspection device may pre-process the photographed first refrigerator image, and extract a feature value from the pre-processed first refrigerator image. The intelligent inspection device may compare the extracted feature value with the reference line of the inspection frame to analyze the comparison, and recognize whether the step is present in the refrigerator based on the result of the analysis. When it is recognized that the step is present in the refrigerator, the intelligent inspection device may determine information about the guide on how to use a tool, which allows a user to repair the step in the refrigerator by himself/herself.

As shown in FIG. 11(a), the intelligent inspection device may display an area 192 in which repair is to be performed in the door of the refrigerator on the display unit. The intelligent inspection device may display the area 192 in which repair is to be performed in a different color from other areas.

As shown in FIG. 11(b), the intelligent inspection device may enlarge only the area 192 in which repair is to be performed and display the enlarged area on the center area of the display unit. The intelligent inspection device may display a tool to repair the step in the refrigerator together with the enlarged area 192 in which repair is to be performed. The intelligent inspection device may display an image for repairing the step in the refrigerator with the tool.

Hereinbefore, although it has been described that the intelligent inspection device according to the embodiment of the present disclosure provides the image for repairing the step in the refrigerator with the tool through the display unit, the present disclosure is not limited thereto, and the step in the refrigerator may be repaired through the AR device.

Extended reality (XR) collectively refers to virtual reality (VR), augmented reality (AR), and mixed reality (MR). As a computer graphic technology, the VR technology provides an object or a background of the real world only as a CG image, the AR technology provides an image of the real things and a CG image that is virtually created on the image of the real things together, and the MR technology provides an image by mixing and combining virtual objects with the real world.

The MR technology is similar to the AR technology in that it shows both real object and virtual object. However, there is a difference in that in the AR technology, the virtual object is used as a complementary form to the real object, whereas in the MR technology, the virtual object and the real object are used in an equivalent nature.

The XR technology may be applied to a head mounted display (HMD), a head-up display (HUD), a mobile phone, a tablet PC, a laptop, a desktop, a TV, a digital signage, and the like, and a device to which the XR technology is applied may be referred to as an XR device.

Hereinafter, an electronic device providing extended reality according to the embodiment of the present disclosure will be described.

Hereinafter, the electronic device described as an example of the present disclosure will be described with reference to an embodiment applied to a head mounted display (HMD). However, the embodiment of the electronic device according to the present disclosure may include a mobile phone, a smartphone, a laptop computer, a terminal for digital broadcasting, personal digital assistants (PDA), a portable multimedia player (PMP), a navigation device, a slate PC, a tablet PC, an ultrabook, and a wearable device. In addition to the HMD, the wearable device may include a smartwatch and a contact lens.

Figure 12:
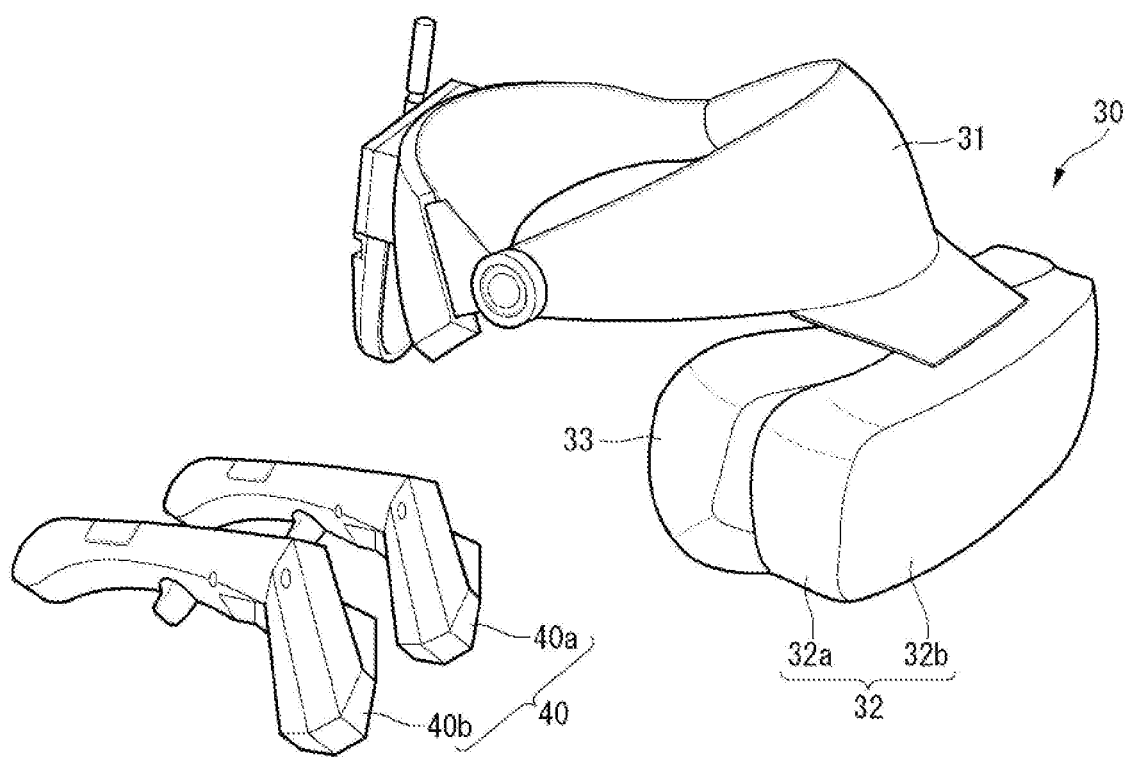
FIG. 12 is a perspective view of a VR electronic device according to one embodiment of the present disclosure.
Figure 13:
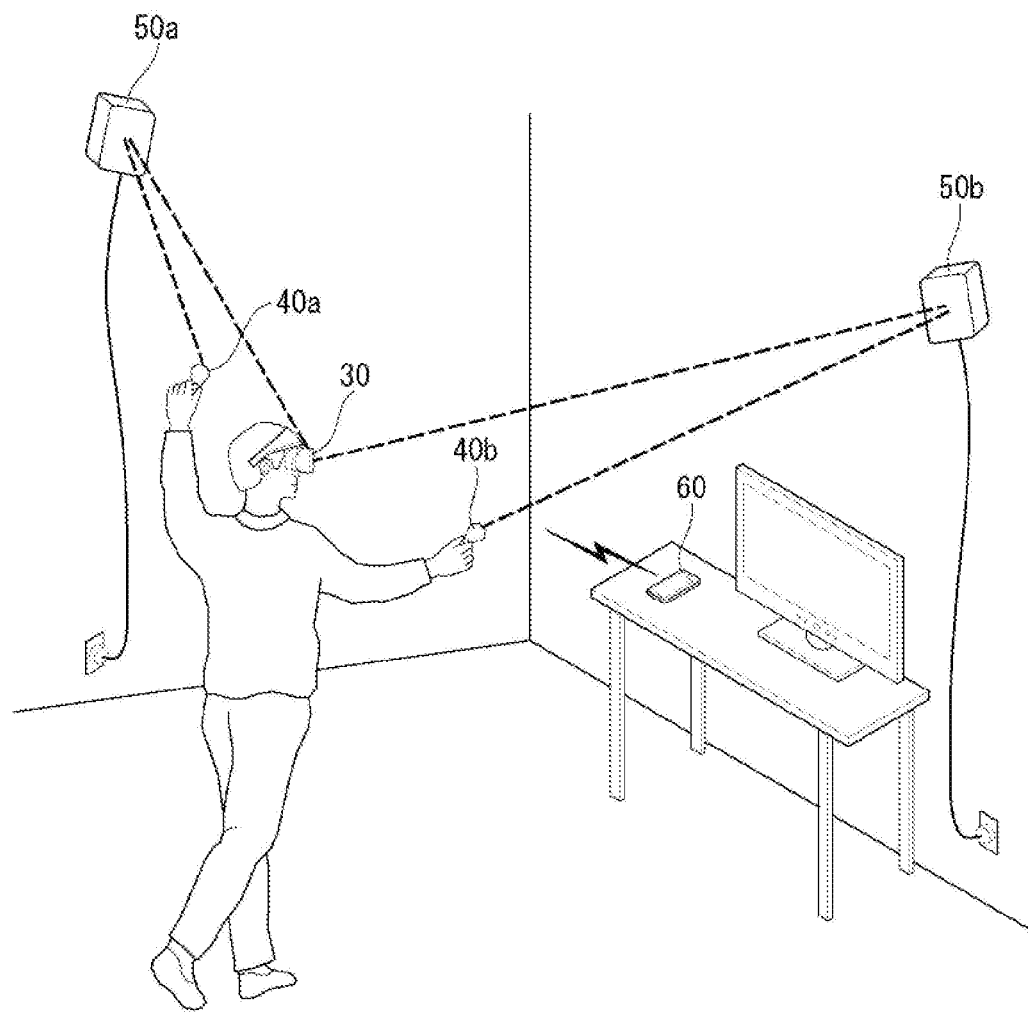
FIG. 13 illustrates a situation in which the VR electronic device of FIG. 12 is used.

FIG. 12 is a perspective view of a VR electronic device according to one embodiment of the present disclosure, and FIG. 13 illustrates a situation in which the VR electronic device of FIG. 12 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 14:
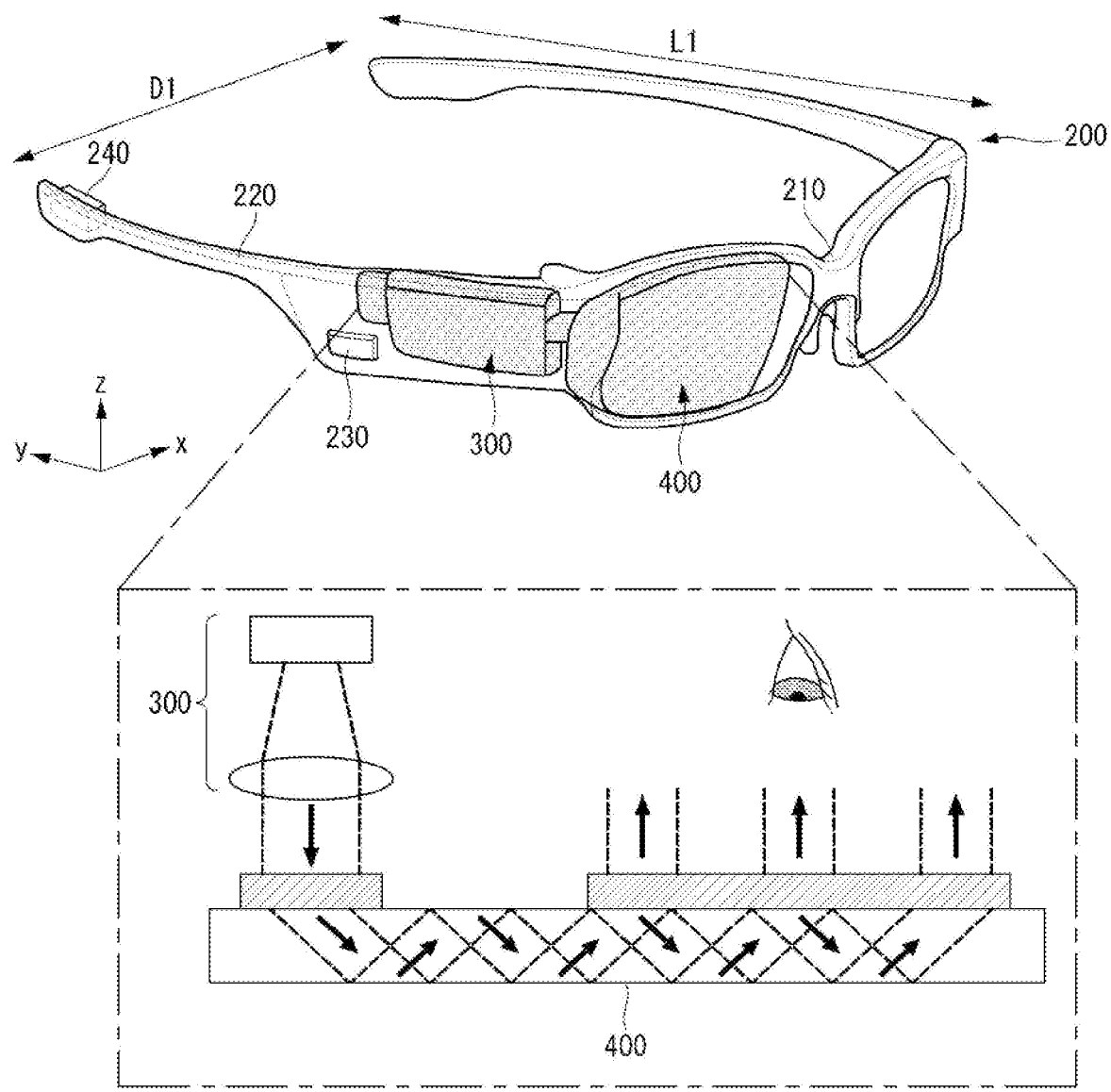
FIG. 14 is a perspective view of an AR electronic device according to one embodiment of the present disclosure.

FIG. 14 is a perspective view of an AR electronic device according to one embodiment of the present disclosure.

As shown in FIG. 14, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 14, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Figure 15:
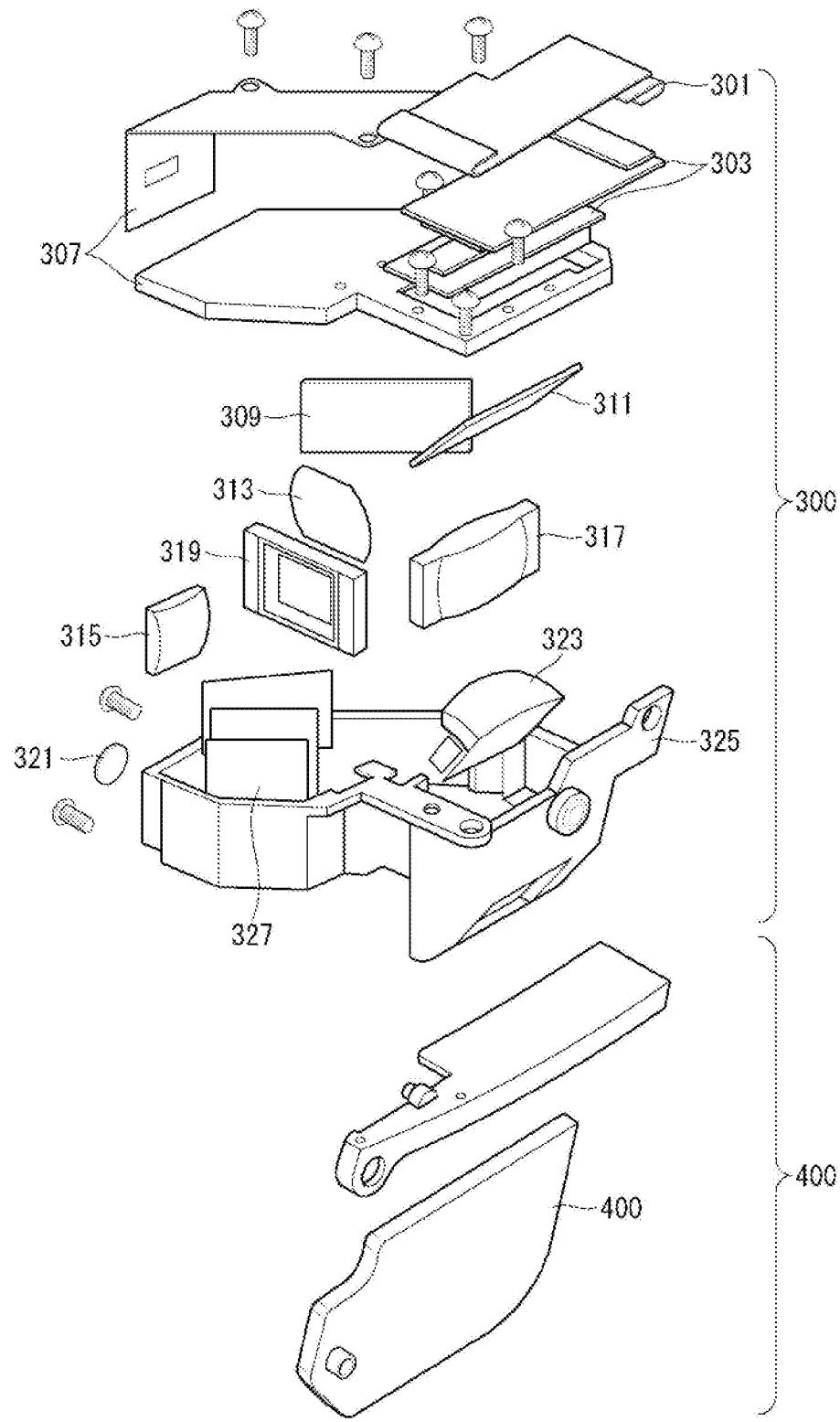
FIG. 15 is an exploded perspective view of a controller according to one embodiment of the present disclosure.

FIG. 15 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIG. 16 is a diagram illustrating an example of repairing the step in the refrigerator by using an augmented reality electronic device according to the embodiment of the present disclosure.

Referring to FIG. 16(a), a user may wear an augmented reality electronic device. The augmented reality electronic device may receive repair information on a guide for repairing the step in the refrigerator by using a tool as well as information indicating whether the step is present in the refrigerator, from the intelligent inspection device.

As shown in FIG. 16(b), when the user approaches the refrigerator in a state of wearing the augmented reality electronic device, the user may view the refrigerator through the augmented reality electronic device and at the same time may view the area 192 of the step to be repaired in the refrigerator, which is generated by the control unit, together with the tool image. That is, the image output through the display unit 400 may appear to overlap with the general field of view. The augmented reality electronic device may provide an augmented reality (AR) that displays one image formed by superimposing a virtual image on a real image or a background using such display characteristics.

Accordingly, as shown in FIG. 16(c), the user wearing the augmented reality electronic device may first experience an augmented reality (AR) for repairing a step in the refrigerator provided by the display unit 400. Then, as shown in FIG. 16(*d*), the user may repair the step in the refrigerator along the augmented reality.

The augmented reality electronic device sequentially displays a process of repairing a step in the refrigerator, and displays the process at regular time intervals, so that the user may sequentially repair the step in the refrigerator along the virtual image.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. An intelligent inspection device, comprising:
  a communication unit;
  a memory configured to store a learning model;
  a camera configured to photograph a refrigerator having two or more doors; and
  one or more processors configured to inspect a step difference between the two or more doors of the refrigerator,
  wherein the one or more processors are configured to:
  capture a first refrigerator image of the refrigerator via the camera, wherein the refrigerator is positioned in a preset area of an inspection frame;
  determine whether the step difference between the two or more doors of the refrigerator is present in the refrigerator using the learning model stored in the memory based on a comparison of the first refrigerator image of the refrigerator and the inspection frame;
  generate solution method data for the step difference based on the comparison; and
  transmit the solution method data to an augmented reality electronic device via the communication unit to cause the augmented reality electronic device to display a real image of the refrigerator superimposed with a virtual image of an area of the step difference to be repaired and an image of a tool to be used for the solution method data, and to sequentially display, in augmented reality, a process of repairing the step difference in the refrigerator.

2. The intelligent inspection device of claim 1, wherein the one or more processors are further configured to:
  determine the learning model to be used for the refrigerator based on the first refrigerator image and set the inspection frame based on the determined learning model.

3. The intelligent inspection device of claim 2, wherein the one or more processors are further configured to:
  pre-process the first refrigerator image; and
  extract a feature value from the pre-processed first refrigerator image.

4. The intelligent inspection device of claim 3, wherein the one or more processors is further configured to pre-process the first refrigerator image by using one of gray-scaling, blurring, sharpening, canny edge detection, thresholding, erosion, morphology, or noise removal.

5. The intelligent inspection device of claim 2, wherein the one or more processors is further configured to align the first refrigerator image with the inspection frame by adjusting a size or a position of the first refrigerator image.

6. The intelligent inspection device of claim 2, wherein the inspection frame comprises:
  a first reference line formed at an upper side of the inspection frame;
  a second reference line vertically spaced apart from the first reference line and formed at a lower side of the inspection frame;
  a third reference line formed at a left side of the inspection frame; and
  a fourth reference line laterally spaced apart from the third reference line and formed at a right side of the inspection frame.

7. The intelligent inspection device of claim 6, wherein comparing the first refrigerator image with the inspection frame comprises:
  comparing an upper side of a left door of the refrigerator or an upper side of a right door of the refrigerator with the first reference line or comparing a lower side of the left door of the refrigerator or a lower side of the right door of the refrigerator with the second reference line; and
  determining whether the step difference is present comprises using the learning model to recognize whether the step difference is present.

8. The intelligent inspection device of claim 2, further comprising a display unit,
  wherein the one or more processors is further configured to display information of the solution method data via the display unit.

9. The intelligent inspection device of claim 1, wherein the transmitted solution method data is further configured to cause the augmented reality electronic device to display the process of repairing the step difference while maintaining a constant time interval.

10. The intelligent inspection device of claim 1, wherein the one or more processors is further configured to:
  receive via the communication unit, from a network, downlink control information (DCI) to be used for scheduling transmission of information of the inspection performed by the intelligent inspection device; and
  transmit, via the communication unit, the information of the inspection to the network based on the DCI.

11. The intelligent inspection device of claim 10, wherein the one or more processors is further configured to:
  perform an initial access procedure with the network based on a synchronization signal block (SSB); and
  transmit, via the communication unit, the information on the result of the inspection to the network through a physical uplink shared channel (PUSCH),
  wherein demodulation reference signals (DM-RS) of the SSB and the PUSCH are quasi co-located (QCLed) for QCL type D.

12. An intelligent inspection device, comprising:
  a communication unit;
  a camera configured to photograph a refrigerator having two or more doors; and one or more processors configured to inspect a step difference between the two or more doors of the refrigerator, wherein the one or more processors are configured to:

capture a first refrigerator image of the refrigerator via the camera, wherein the refrigerator is positioned in a preset area of an inspection frame;

determine a reference model for the refrigerator based on the first refrigerator image; and obtain a determination of whether the step difference between the two or more doors of the refrigerator is present in the refrigerator based on a comparison of the first refrigerator image of the refrigerator and the inspection frame;

generate solution method data for the step difference based on the comparison; and transmit the solution method data to an augmented reality electronic device via the communication unit to cause the augmented reality electronic device to display a real image of the refrigerator superimposed with a virtual image of an area of the step difference to be repaired and an image of a tool to be used for the solution method data, and to sequentially display, in augmented reality, a process of repairing the step difference in the refrigerator.

13. The intelligent inspection device of claim 12, wherein the one or more processors are further configured to provide the first refrigerator image and the determined reference model to an artificial intelligence (AI) processing server via the communication unit, and obtain the determination of whether the step difference is present from the AI server.

* * * * *